US010765265B2

(12) United States Patent
Joe

(10) Patent No.: US 10,765,265 B2
(45) Date of Patent: Sep. 8, 2020

(54) CULINARY TOOL HOLDER

(71) Applicant: Mitchell Leighton Joe, San Francisco, CA (US)

(72) Inventor: Mitchell Leighton Joe, San Francisco, CA (US)

(*) Notice: Subject to any disclaimer, the term of this patent is extended or adjusted under 35 U.S.C. 154(b) by 0 days.

(21) Appl. No.: 16/195,450

(22) Filed: Nov. 19, 2018

(65) Prior Publication Data
US 2019/0150673 A1 May 23, 2019

Related U.S. Application Data

(60) Provisional application No. 62/588,904, filed on Nov. 20, 2017.

(51) Int. Cl.
*A47B 91/00* (2006.01)
*A47J 47/16* (2006.01)
*A47G 21/00* (2006.01)
*A47G 21/14* (2006.01)

(52) U.S. Cl.
CPC ............. *A47J 47/16* (2013.01); *A47G 21/00* (2013.01); *A47G 21/14* (2013.01)

(58) Field of Classification Search
CPC .................................. A47G 21/14; A24F 9/14
See application file for complete search history.

(56) References Cited

U.S. PATENT DOCUMENTS

| 2,664,005 | A | * | 12/1953 | Kosinski | A47J 47/16 211/70.1 |
| 3,382,986 | A | * | 5/1968 | Pfeiffer | A24F 9/14 211/70.1 |
| 3,888,265 | A | * | 6/1975 | Yount | A24F 9/14 131/260 |
| 8,668,171 | B2 | * | 3/2014 | Tarantino | A47G 21/14 220/500 |
| 2013/0087664 | A1 | * | 4/2013 | Weavel | A47G 21/14 248/37.3 |

* cited by examiner

*Primary Examiner* — Amy J. Sterling
(74) *Attorney, Agent, or Firm* — Kali Law Group, P.C.

(57) ABSTRACT

Culinary tool holders are presented including: a planar base; an upward sloping support member formed along a base edge of the planar base; a downward sloping support member formed along a peak edge of the upward sloping support member; a cutout disposed from and along a first portion of the upward sloping support member toward the peak edge and continuing to and along a second portion of the downward sloping support member; and an insert captured by the cutout. In some embodiments, culinary tools holders further include: a raised holder edge disposed along a perimeter defined by the planar base, the upward sloping support member, and the downward sloping support member.

10 Claims, 6 Drawing Sheets

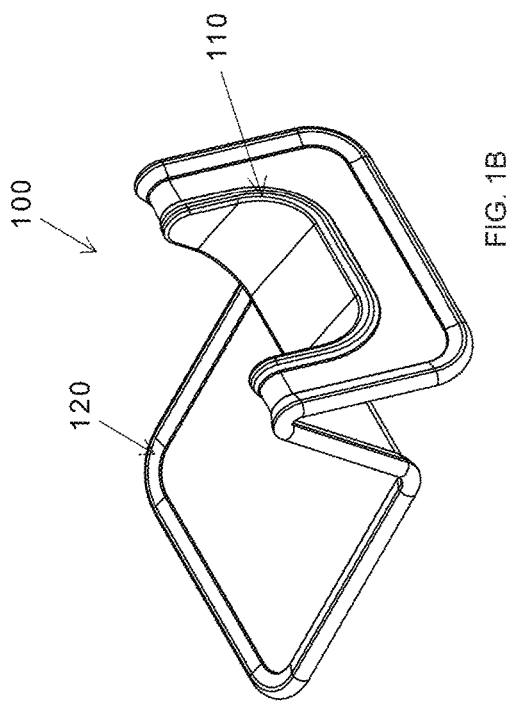
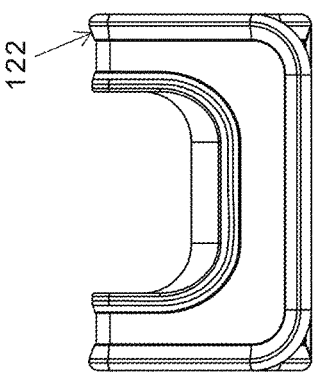
FIG. 1B
FIG. 1E
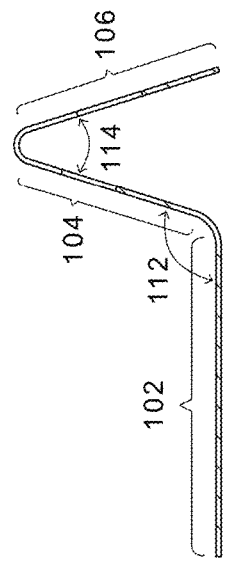
FIG. 1A SECTION A-A
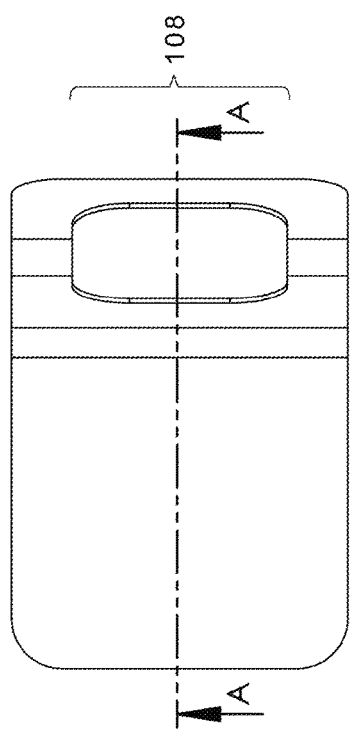
FIG. 1C
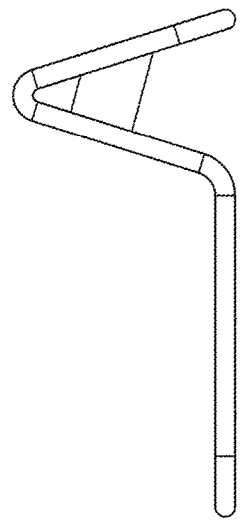
FIG. 1D

CULINARY TOOL HOLDER

BACKGROUND

Dealing with culinary tools that are being used during a cooking period is a long-standing problem in the culinary arts. Flattened and shaped spoon holders are common, but tend to create a mess since food is transferred to the holder each time it is used. This is particularly troublesome when dealing with several different preparations as cross-contamination may occur. Some solutions have attempted to overcome this problem by providing a raised rest that elevates the used end of the tool from a counter surface. However, these solutions are not generally wide enough to accommodate larger tools and, due to their design, place the tool in an unbalanced position which may lead to tipping and scattering of food debris.

As such, culinary tool holders are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, culinary tool holders are presented including: a planar base; an upward sloping support member formed along a base edge of the planar base; a downward sloping support member formed along a peak edge of the upward sloping support member; a cutout disposed from and along a first portion of the upward sloping support member toward the peak edge and continuing to and along a second portion of the downward sloping support member; and an insert captured by the cutout. In some embodiments, culinary tools holders further include: a raised holder edge disposed along a perimeter defined by the planar base, the upward sloping support member, and the downward sloping support member. In some embodiments, the raised holder edge is manufactured from a material such as: a polymeric material, a silicone material, a natural rubber material, a thermoplastic elastomer material, and a foamed thermoplastic material. In some embodiments, the planar base, the upward sloping support member, and the downward sloping support member are formed from a single metallic layer. In some embodiments, the planar base, the upward sloping support member, the downward sloping support member and the insert are formed from a single layer manufactured such as: a polymeric material, a silicone material, a natural rubber material, a thermoplastic elastomer material, and a foamed thermoplastic material. In some embodiments, culinary tools holders further include: a number of retaining holes disposed adjacent to a cutout edge; and a number of retaining tabs disposed along the insert, where the holes are positioned to receive the retaining tabs and where the insert further includes: an insert raised edge. In some embodiments, the insert includes: a floor disposed along the first portion and the second portion for receiving a culinary tool, where the floor slopes downwardly from the first portion to the second portion; and two inward sloping walls each extending from the floor upward. In some embodiments, the floor includes a feature such as: a vee-groove, a number of vee-grooves, a channel or number of channels, a number of raised bars, a number of raised fins, a number of raised pillars, a number of raised bumps, and a thin wall disposed across the floor and coupled with the floor and the walls. In some embodiments, the insert is manufactured from a material such as: a polymeric material, a silicone material, a natural rubber material, a thermoplastic elastomer material, and a foamed thermoplastic material.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1E are illustrative representations of various views of a culinary tool holder in accordance with embodiments of the present invention;

DETAILED DESCRIPTION

Figure 2C:
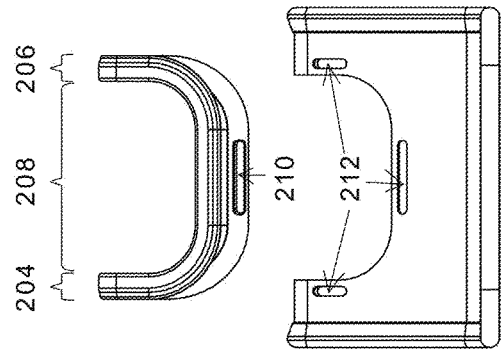
FIGS. 2A-2C are illustrative representations of various views of a culinary tool holder in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

FIGS. 1A-1E are illustrative representations of various views of culinary tool holder 100 in accordance with embodiments of the present invention. As illustrated, culinary tool holder embodiments include at least: planar base 102; upward sloping support member 104 formed along a base edge of planar base 102; and downward sloping support member 106 formed along a peak edge of the upward sloping support member 104. In embodiments, planar base 102, upward sloping support member 104, and downward sloping support member 106 are formed from a single metallic layer. In single metallic layer embodiments, culinary tool holder embodiments include radius 112 formed during manufacture between planar base 102 and upward sloping support member 104; and radius 114 formed during manufacture between upward sloping support member 104 and downward sloping support member 106. In embodiments, radius 112 is in a range of approximately 90 to 110 degrees—In a preferred embodiment, 105 degrees—and radius 114 is in a range of approximately 25 to 35 degrees—In a preferred embodiment, 30 degrees. In other embodiments, planar base 102, upward sloping support member 104, downward sloping support member 106, and insert 110 are formed from a single layer manufactured from a material such as: a polymeric material, a silicone material, a natural rubber material, a thermoplastic elastomer material, and a foamed thermoplastic material using suitable manufacturing techniques utilized and well-known in the art.

Additionally, illustrated is cutout 108 disposed from and along upward sloping support member 104 toward the peak edge and continuing to and along downward sloping support member 106. Further illustrated is insert 110 which is captured by cutout 108. In embodiments, inserts may be configured in a number of different manners. As such, inserts will be discussed in further detail below for FIGS. 2 and 3. Still further illustrated is raised edge 120 disposed along a perimeter defined by planar base 102, upward sloping support member 104, and downward sloping support member 106. A raised edge manufactured from a suitable material will provide gripping action on the bottom surface of planar base 102 as well as will capture fluids and debris from a culinary tool on the top surface of planar base 102. In order to provide more efficient cleaning, raised edge embodiments may include a tapered edge 122 formed along the inside edge of the raised edge. In embodiments, raised edges may be manufactured from a material such as: polymeric material, a silicone material, a natural rubber material, a thermoplastic elastomer material, and a foamed thermoplastic material.

Figure 2A:
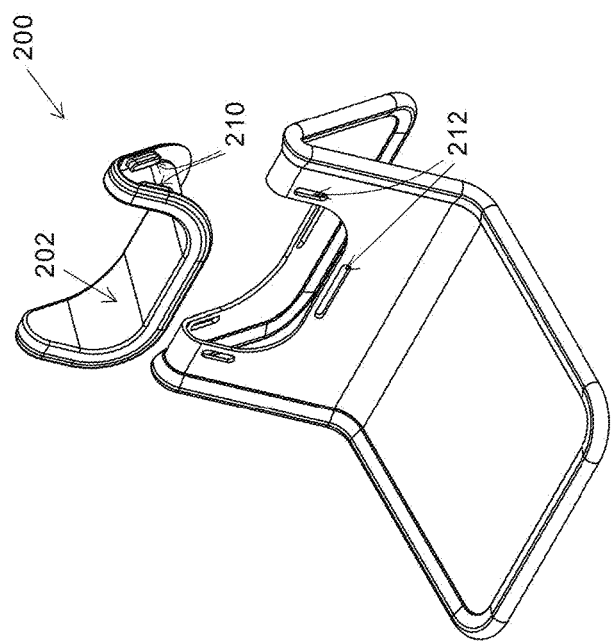
Figure 2B:
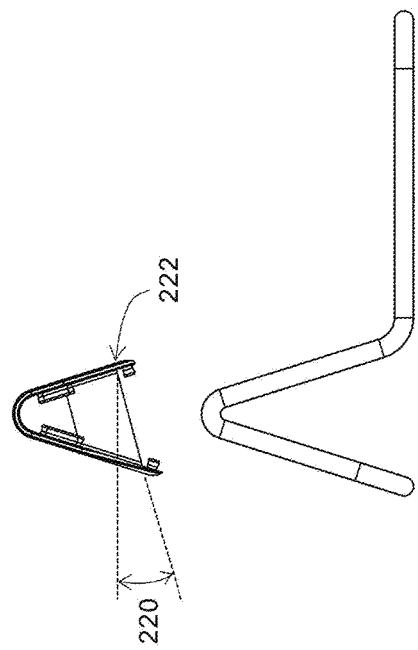
Figure 3B:
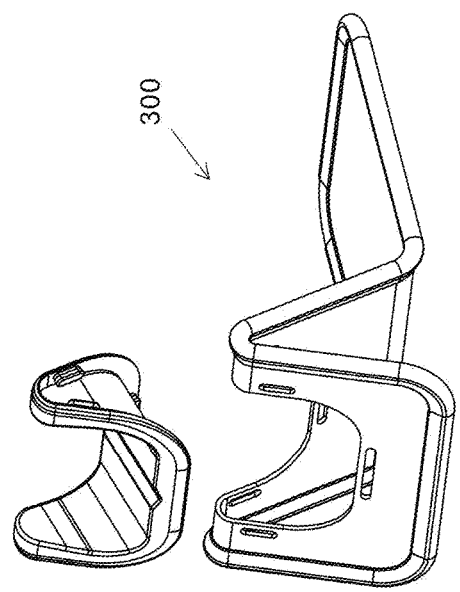
FIGS. 3A-3E are illustrative representations of various views of a culinary tool holder in accordance with embodiments of the present invention.
Figure 3E:
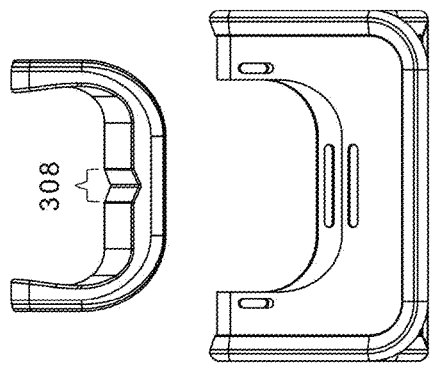
Figure 3A:
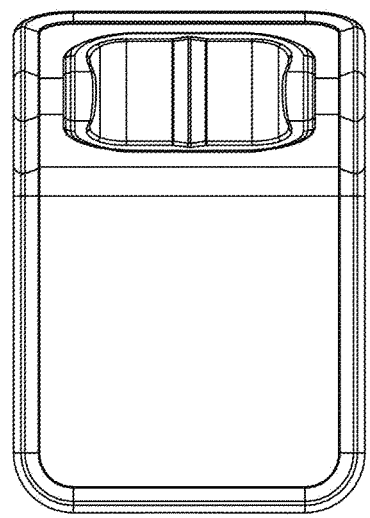
Figure 3D:
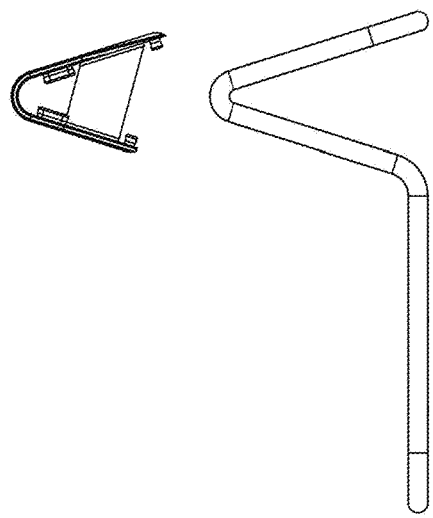
Figure 3C:
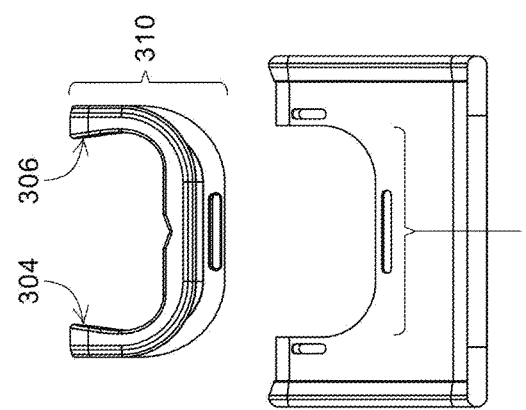
Figure 4:
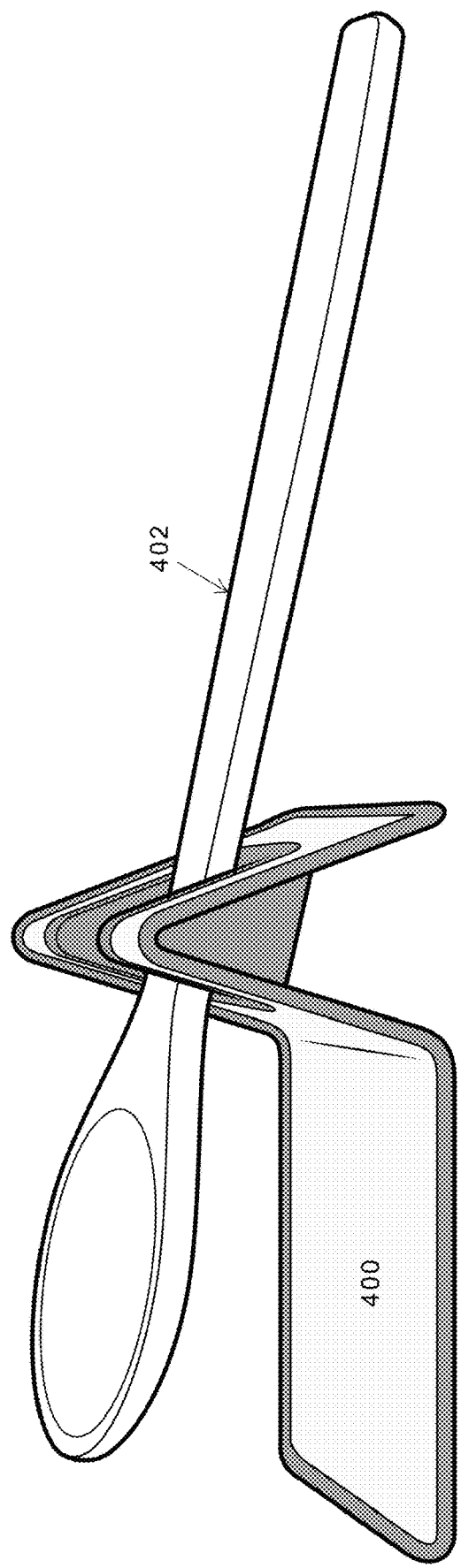
FIG. 4 is an illustrative representation of a culinary tool holder in use in accordance with embodiments of the present invention.

FIGS. 2A-2C are illustrative representations of various views of culinary tool holder 200 in accordance with embodiments of the present invention. In particular, FIG. 2 illustrates various aspects of insert 202. As noted above, inserts may be captured by a cutout. In some embodiments, to secure an insert to a cutout, a number of retaining holes 212 are disposed adjacent to a cutout edge. Also illustrated are a number of retaining tabs 210 disposed along the insert edge such that the holes are positioned to receive the retaining tabs. In this manner, the insert is securely coupled with the cutout. As illustrated, insert includes walls 204 and 206 along with floor 208. In the illustrated embodiment, the walls are substantially vertical and the floor is flat. A flat-bottomed U-shape allows a user to place a flat-handled utensil anywhere along the bottom of the U-shape so that the utensil will lay flat, while a conventionally curved-bottomed U-shape does not allow the utensil to lay flat. Further, the floor, in embodiments, slopes downwardly from the upward sloping support member to the downward sloping support member as indicated by angle 220. The angle is in a range of approximately 15 to 25 degrees—In a preferred embodiment, 20 degrees. By sloping the floor, contact point 222 with a culinary tool is shifted toward the base and therefore tends to prevent the culinary tool from tipping as in, for example FIG. 4 which illustrates culinary tool holder 400 holding spoon 402. As can be seen, the spoon head is heavier than the handle and is positioned over the planar base. Because the contact point is shifted (relatively) toward the spoon head, the spoon is less likely to tip. In addition, because the contact point is shifted toward the planar base, the resting point of the spoon may likewise be shifted toward the planar base, which means that the dirty part of the spoon head is shifted away from the U-shaped insert, making it less likely that the dirty portion of the spoon head will touch and therefore dirty the U-shaped insert. In conventional holders, the floor is generally parallel with the base, which moves the point of contact away from the base. In conventional configurations, tipping is much more likely. In embodiments, inserts may be manufactured from a material such as: a polymeric material, a silicone material, a natural rubber material, a thermoplastic elastomer material, and a foamed thermoplastic material.

Figure 5:
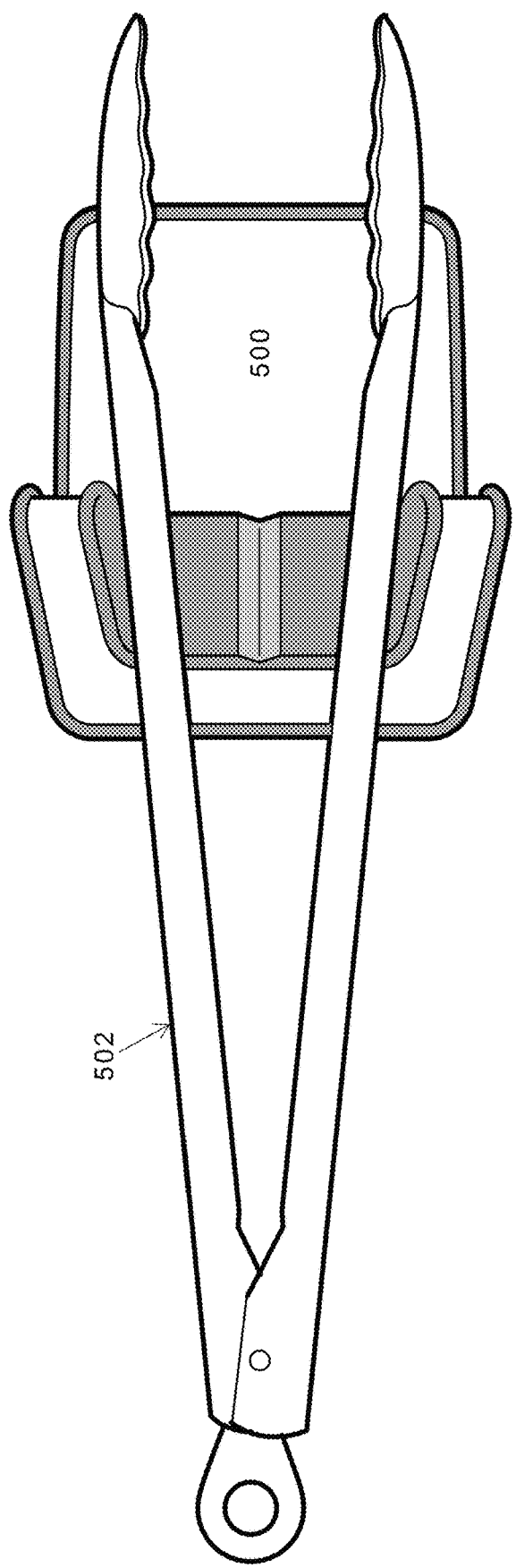
FIG. 5 is an illustrative representation of a culinary tool holder in use in accordance with embodiments of the present invention.
Figure 6:
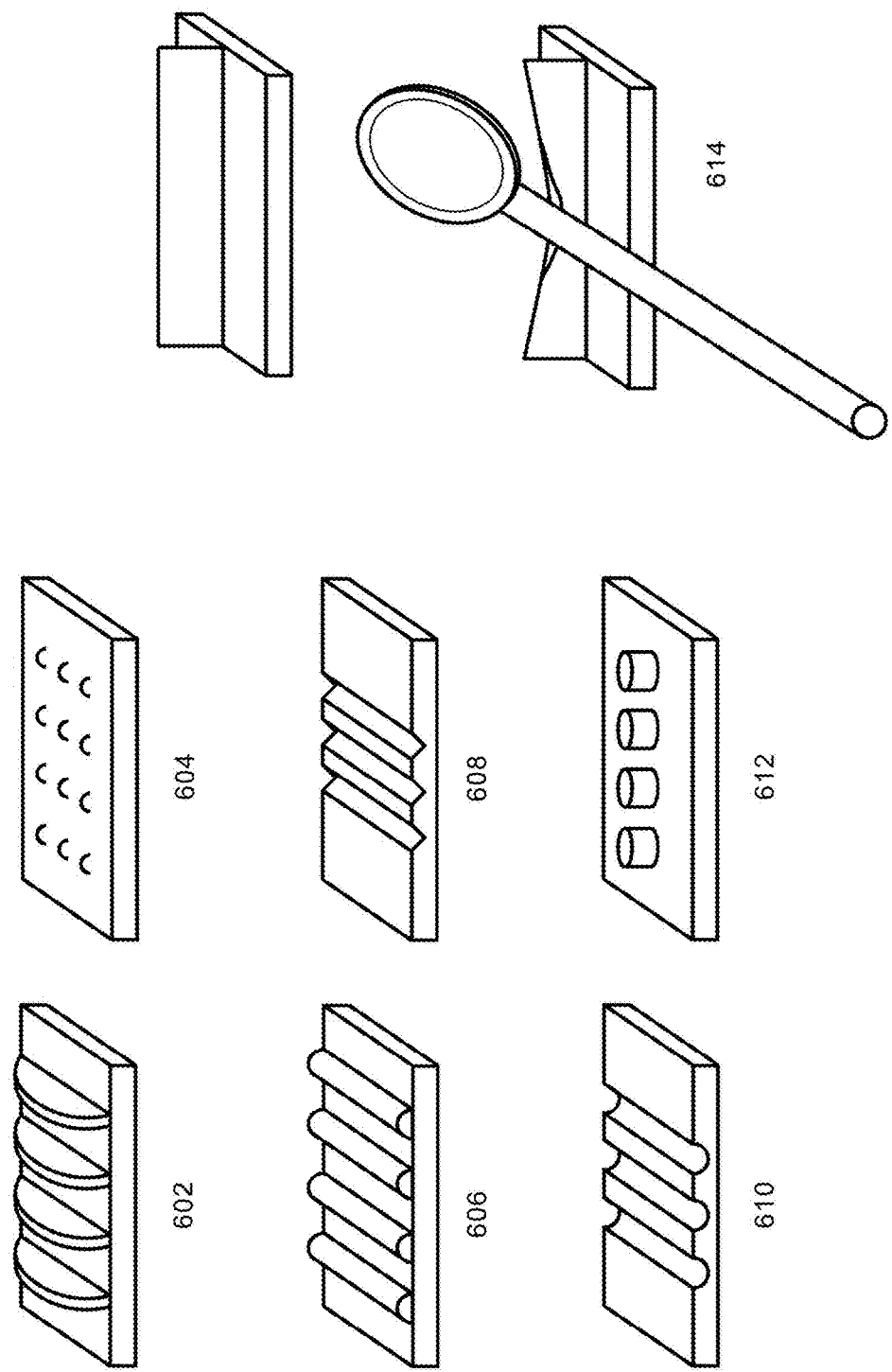
FIG. 6 is an illustrative representation of culinary tool holder floor features in accordance with embodiments of the present invention.

FIGS. 3A-3E are illustrative representations of various views of culinary tool holder 300 in accordance with embodiments of the present invention. As illustrated, insert 310 includes inward sloping walls 304 and 306 that extend from floor 312 upward. Inward sloping walls are useful in capturing tongs as illustrated in FIG. 5, which illustrates culinary tool holder 500 in use with tongs 502. Because tongs are typically spring loaded to open outwardly, inward sloping wall embodiments will more securely hold the tongs and keep them from snapping open. In embodiments, inward sloping walls are sloped in a range of approximately 0 to 15 degrees—In a preferred embodiment, 10 degrees. Returning to FIG. 3, embodiments disclosed include one or more features such as feature 308, which is a vee-groove. By adding this type of feature, a culinary tool may be prevented from rolling. Other features include, a plurality of vee-grooves (see 608, FIG. 6), a channel or plurality of channels (see 610, FIG. 6), a plurality of raised bars (see 606, FIG. 6), a plurality of raised bumps (see 604, FIG. 6), a plurality of fins (see 602, FIG. 6), a plurality of raised pillars (see 612, FIG. 6), and a thin wall disposed across the floor and coupled with the floor and the walls (see 614, FIG. 6).

One skilled in the art will readily recognize that sizing and positioning of features are selected to improve culinary tool holding. As above, inserts may be manufactured from a material such as: a polymeric material, a silicone material, a natural rubber material, a thermoplastic elastomer material, and a foamed thermoplastic material. Preferred materials are soft and "grippy" to improve contact with a culinary tool.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A culinary tool holder comprising:
   a planar base;
   an upward sloping support member formed along a base edge of the planar base;
   a downward sloping support member formed along a peak edge of the upward sloping support member;
   a cutout disposed from and along a first portion of the upward sloping support member toward the peak edge and continuing to and along a second portion of the downward sloping support member; and
   an insert captured by and entirely covering the cutout, wherein the insert forms a top surface having a contact point toward the planar base such that contact between the insert and a culinary tool is shifted toward the planar base.

2. The culinary tool holder of claim 1 further comprising:
   a raised holder edge disposed along a perimeter defined by the planar base, the upward sloping support member, and the downward sloping support member.

3. The culinary tool holder of claim 2, wherein the raised holder edge is manufactured from a material selected from the group consisting of: a polymeric material, a silicone material, a natural rubber material, a thermoplastic elastomer material, and a foamed thermoplastic material.

4. The culinary tool holder of claim 1, wherein the planar base, the upward sloping support member, and the downward sloping support member are formed from a single metallic layer.

5. The culinary tool holder of claim 1, wherein the planar base, the upward sloping support member, the downward sloping support member and the insert are formed from a single layer manufactured from a material selected from the group consisting of: a polymeric material, a silicone material, a natural rubber material, a thermoplastic elastomer material, and a foamed thermoplastic material.

6. The culinary tool holder of claim 1 further comprising:
   a plurality of retaining holes disposed adjacent to a cutout edge; and
   a plurality of retaining tabs disposed along the insert, wherein the holes are positioned to receive the retaining tabs and wherein the insert further comprises:
   an insert raised edge.

7. The culinary tool holder of claim 1, wherein the insert comprises:
   a floor disposed along the first portion and the second portion for receiving a culinary tool, wherein the floor slopes downwardly from the first portion to the second portion; and
   two inward sloping walls each extending from the floor upward.

8. The culinary tool holder of claim 7, wherein the floor comprises a feature selected from the group consisting of: a vee-groove, a plurality of vee-grooves, a channel or plurality of channels, a plurality of raised bars, a plurality of raised bumps, a plurality of fins, a plurality of raised pillars, and a thin wall disposed across the floor and coupled with the floor and the walls.

9. The culinary tool holder of claim 1, wherein the insert is manufactured from a material selected from the group consisting of: a polymeric material, a silicone material, a natural rubber material, a thermoplastic elastomer material, and a foamed thermoplastic material.

10. The culinary tool holder of claim 1, wherein the floor slopes downwardly from the first portion to the second portion at an angle in a range of approximately 15 to 25 degrees.

* * * * *